US009830829B1

(12) United States Patent
Doyen et al.

(10) Patent No.: US 9,830,829 B1
(45) Date of Patent: Nov. 28, 2017

(54) MANAGEMENT SYSTEM AND METHODS FOR IMPLEMENTING AIRCRAFT INTENTIONS HARMONIZATION

(71) Applicant: ROCKWELL COLLINS, INC., Cedar Rapids, IA (US)

(72) Inventors: William George Doyen, Annapolis, MD (US); Geoffrey A. Shapiro, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 22 days.

(21) Appl. No.: 14/827,377

(22) Filed: Aug. 17, 2015

(51) Int. Cl.
*G08G 5/00* (2006.01)
*G01C 23/00* (2006.01)
*B64D 45/08* (2006.01)
*G08G 5/02* (2006.01)
*G05D 1/06* (2006.01)
(Continued)

(52) U.S. Cl.
CPC ......... *G08G 5/0082* (2013.01); *G08G 5/0008* (2013.01); *G08G 5/0021* (2013.01); *B64D 45/04* (2013.01); *B64D 45/08* (2013.01); *G01C 5/00* (2013.01); *G01C 23/00* (2013.01); *G05D 1/0083* (2013.01); *G05D 1/06* (2013.01); *G05D 1/0676* (2013.01); *G05D 1/101* (2013.01); *G06F 19/00* (2013.01); *G08G 5/0026* (2013.01);
(Continued)

(58) Field of Classification Search
CPC .. G08G 5/0026; G08G 5/0043; G08G 5/0008; G08G 5/065; G08G 5/025; G08G 5/0082; G08G 5/0021; G08G 5/008; B64C 39/024; G05D 1/0083; G05D 1/00; G05D 1/0676; G05D 1/06; G05D 1/101; G06F 19/00; B64D 45/04; B64D 45/08; G01C 23/00
See application file for complete search history.

(56) References Cited

U.S. PATENT DOCUMENTS

| | | | |
|---|---|---|---|
| 2004/0044446 A1* | 3/2004 | Staggs | G05D 1/0676 701/16 |
| 2007/0203620 A1* | 8/2007 | Gremmert | G05D 1/101 701/9 |

(Continued)

*Primary Examiner* — Behrang Badii
(74) *Attorney, Agent, or Firm* — Angel N. Gerdzhikov; Donna P. Suchy; Daniel M. Barbieri

(57) ABSTRACT

A system and method are provided for integrating voice communication systems with voice recognition devices or units and myriad other data sources to provide a harmonization between intended aircraft operations and actual aircraft operations, including logical components to provide a mechanism to flag certain alert communications that signal the initiation of particular response scenarios based on detected terms and track initiation of pre-planned processes to address specific events that are signaled through the use of the detected terms. Information from myriad data sources is collected and integrated to provide an indication of intended operations for an aircraft. A data comparison device compares the indicated real-time intended operations of the aircraft with actual monitored operations of the aircraft to discern unacceptable deviations. Data sources include operator-generated data transmissions, voice transcriptions, automated voice recognized information, measurable operations of the aircraft, and prescribed operating guidance, directives and parameters for the aircraft.

27 Claims, 3 Drawing Sheets

(51) Int. Cl.
*B64D 45/04* (2006.01)
*G06F 19/00* (2011.01)
*G01C 5/00* (2006.01)
*G08G 5/06* (2006.01)
*G05D 1/00* (2006.01)
*G05D 1/10* (2006.01)

(52) U.S. Cl.
CPC ........... *G08G 5/0043* (2013.01); *G08G 5/025* (2013.01); *G08G 5/065* (2013.01)

(56) References Cited

U.S. PATENT DOCUMENTS

| | | | | |
|---|---|---|---|---|
| 2009/0150009 | A1* | 6/2009 | Villaume | G08G 5/065 |
| | | | | 701/3 |
| 2011/0246002 | A1* | 10/2011 | Shavit | G08G 5/0026 |
| | | | | 701/14 |
| 2013/0218374 | A1* | 8/2013 | Lacko | G08G 5/025 |
| | | | | 701/16 |
| 2015/0081142 | A1* | 3/2015 | Henderson | B64D 45/04 |
| | | | | 701/16 |

* cited by examiner

MANAGEMENT SYSTEM AND METHODS FOR IMPLEMENTING AIRCRAFT INTENTIONS HARMONIZATION

BACKGROUND

1. Field of the Disclosed Embodiments

This disclosure relates to systems and methods for integrating voice communication systems with voice recognition devices or units for parsing voice communications into data elements, data link communications, and myriad other data sources to provide a harmonization between intended aircraft operations and actual aircraft operations, including logical components to provide a mechanism to flag certain alert communications that signal the initiation of particular response scenarios based on detected terms and track initiation of pre-planned processes to address specific events that are signaled through the use of the detected terms.

2. Related Art

Conventionally, a proprietary voice communication service is provided for facilitating air traffic control tasks as follows. Air traffic controllers in various air traffic control facilities worldwide generate and transmit data link messages to centralized communication centers. Operators in the centralized communication centers communicate by voice over various voice-media communication links, including HF, VHF, Iridium, Inmarsat and others, to aircraft in flight to convey the information contained in the messages to those aircraft. Responsive inputs are received via these various voice-media communication links from the aircrew in the aircraft. The received responsive inputs are transcribed and formatted into responsive data link messages by the operators in the centralized communication centers. The transcribed and formatted data link messages are then transmitted to the air traffic controllers in the various air traffic control facilities. In order to provide a requisite level of safety, these systems require an operator in the loop to translate the data to voice for transmission to the aircraft and the voice received from the aircraft to data for transmission to the air traffic control facilities.

It is particularly important that these communications, as they are generated, transmitted, received, transcribed, translated and/or formatted, are precisely accurate. Those of skill in the art recognize that any error in these transmissions may result in equipment damage and/or loss of life. In this regard, these transmissions are indicative of intended maneuvers to be undertaken by the aircraft inflight, including for safe traffic separation and optimal traffic flow in particular regions as controlled by air traffic control facilities, or coordinated through aircraft operations centers.

Additionally, there are prescribed operating parameters for a particular type/model/series of aircraft and controlling entities and agencies, including airlines and governmental concerns, impose certain operating requirements and standard operating procedures for those aircraft over which the particular entity or agency exercises control. As monitoring capabilities for transmitted data from, and voice communication with, operating aircraft become more ubiquitous, the potential exists to monitor compliance with all available guidance and directives to enhance flight safety.

Any manner by which to provide additional crosschecks as to the accuracy of information presented in the voice and data messages in real time or near real time and in the related interaction between air traffic controllers and the aircrew in the aircraft that they control, particularly when the communications are indirect, such as in the scenario outlined above, may enhance safety and prove otherwise beneficial to efficient air traffic control operations. Voice recognition systems and software, for example, have become available for use in many adaptive scenarios involving voice communication, and have been adapted for use, and integrated into a number of use cases and operational scenarios across a broad spectrum of operating environments as data cross checks.

SUMMARY OF THE DISCLOSED SUBJECT MATTER

It would be advantageous to find some manner by which to expand the integration of all source data including voice recognition systems as a cross-check or double-check on communication content in order to identify deviations from intended operation of a particular aircraft. All source monitoring data, including sources of guidance and directives for the safe operation of aircraft, could be integrated in a manner that would allow for real time, or near real time, alerting of operators, including air traffic controllers, to potential deviations or discrepancies between an indicated intent for the operation of an aircraft, as demonstrated by flight planning, operator-translated information regarding voice communications, system-translated information relating to a same voice communication, data transmissions from an aircraft to indicate intent or policy guidelines and criteria for operation of the aircraft, and actual operations of the aircraft.

Exemplary embodiments of the systems and methods according to this disclosure may provide a voice recognition monitoring device or unit, and a data comparison device or unit, that may be usable to indicate real-time intended operations of, for example, an aircraft, for comparison with actual monitored operations of the aircraft. Intended operations for the aircraft may be derivable from operator-generated data transmissions, voice transcriptions, automated voice recognized information, measurable operations of the aircraft, and prescribed operating guidance, directives and parameters for one or more aircraft under the control of a specific entity or agency.

Exemplary embodiments may apply comparative algorithms to review digital data messages against related transmitted and received voice and/or data messages in an effort to ensure that actual aircraft operations comport with intended aircraft operations.

Exemplary embodiments may be usable to provide an additional layer of data analysis quality assurance and flight safety enhancement to ensure that actual flight operations comport with intended flight operations or are, for example, subject to only measured deviations to handle emergent issues inflight.

Exemplary embodiments may provide a list of keywords usable to data mine the communications to recognize certain situations highlighted by use of the particular keywords by either of the air traffic control facilities, or the aircrew in the aircraft that indicate initiation of particular special procedures that may modify the intended operation of the aircraft according to a pre-planned scheme of response.

Exemplary embodiments may integrate currently-available voice communications systems with certain voice recognition software to provide a cross-check or double check of the critical interaction between air traffic control facilities and aircrew in the controlled aircraft in a manner that provides real time update of the intended operation of the aircraft.

Exemplary embodiments may provide a logical overlay whereby particular terms recognized by the automated voice recognition schemes may be compared with certain stored terms associated with pre-planned processes to verify aircraft movement in response to the specific events associated with the particular terms. In embodiments, automated detection of such terms may be usable to alert all to initiation of those pre-planned processes/responses upon accurate identification of the particular terms.

Exemplary embodiments may further data mine the data streams generated according to the disclosed schemes to provide useful actionable information in myriad operational scenarios for discerning intended aircraft operations.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for integrating voice communication systems with voice recognition devices or units for parsing voice communications into data elements, data link communications, and other data sources to provide a harmonization between intended aircraft operations and actual aircraft operations including logical components to provide a mechanism to flag certain alert communications that signal the initiation of particular response scenarios based on detected terms and that may track initiation of pre-planned processes to address specific events that may be signaled through the use of the detected terms, will be described, in detail, with reference to the following drawings, in which.

DESCRIPTION OF THE DISCLOSED EMBODIMENTS

Figure 1:
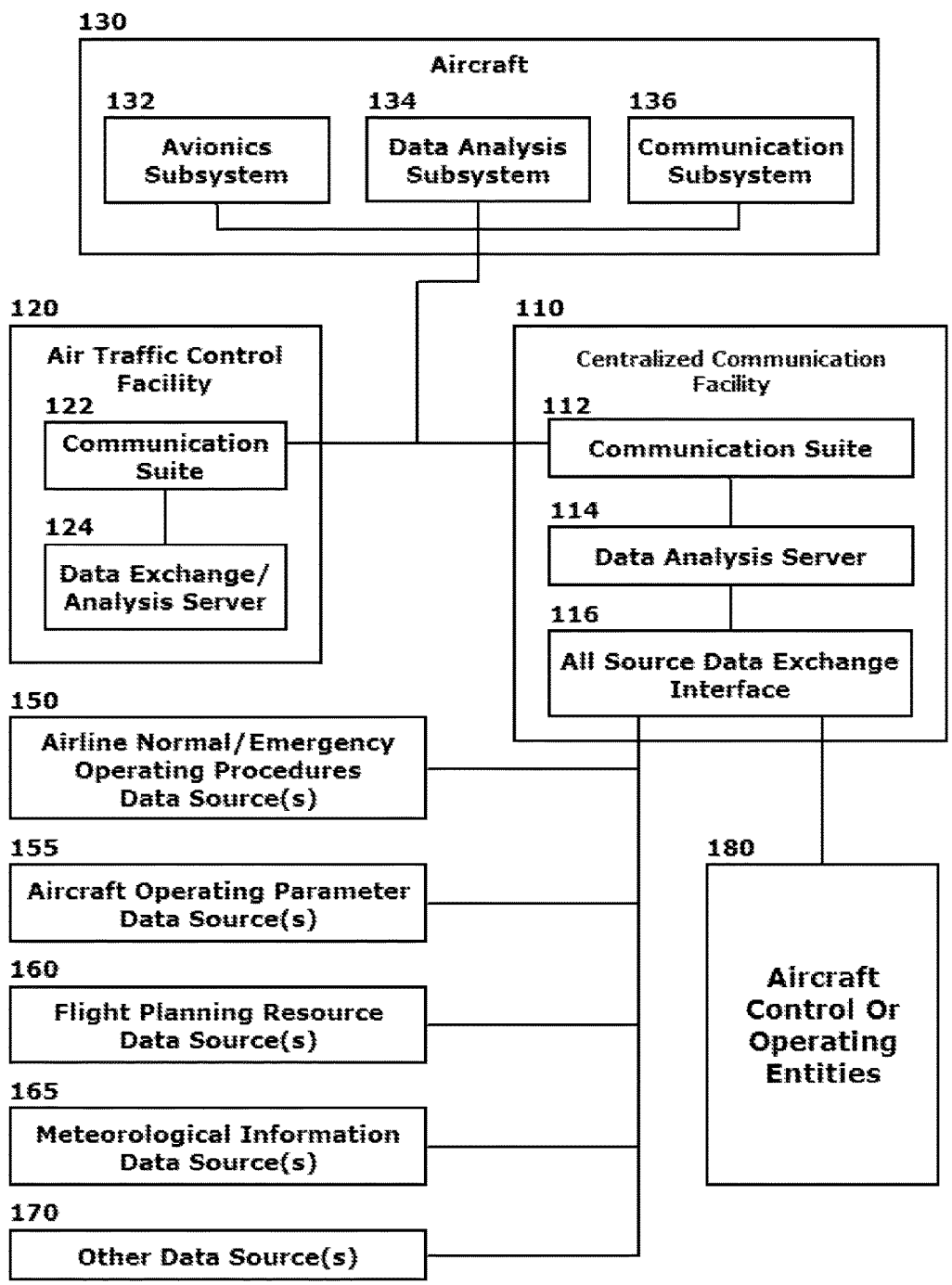
FIG. 1 illustrates an exemplary overview of an operating environment in which the aircraft intent harmonization schemes according to this disclosure may be implemented.

The disclosed systems and methods for integrating voice communication systems with voice recognition devices or units and other data sources to provide a harmonization between intended aircraft operations and actual aircraft operations including logical components to provide a mechanism to flag certain alert communications that signal the initiation of particular response scenarios based on detected terms and that may track initiation of pre-planned processes to address specific events that may be signaled through the use of the detected terms, will generally refer to these specific utilities for those systems and methods.

Exemplary embodiments will be described in this disclosure as being particularly adaptable to use in hybrid voice-data communications in which data may be manually converted to voice, and vice versa, and comparative algorithms that may be used to derive intended aircraft operations from these communications and compare those derived intentions to actual aircraft operations. This comparative analysis may be used to highlight deviations from prescribed, directed or otherwise intended operations in a manner that the deviations may be detected in substantially real time, an appropriate response scenario may be initiated (if required) and/or information may be catalogued and stored for later reference to a number of beneficial purposes.

The disclosed schemes may separately analyze the voice communications using voice recognition units, devices, processes, techniques and/or software and compare the automated analysis of the voice communications with transcribed versions of the voice communications to detect deviations in content, context, reply, aircraft movement, and/or operating procedures that may require some additional action based on the comparison. These analysis schemes may be particularly employed to describe or update an intended movement or maneuver of the aircraft according to emerging issues encountered during aircraft operations.

The descriptions, and particularly detailed review of particular voice and separate data communication employment scenarios, should not be interpreted as specifically limiting the disclosed schemes to any particular situation or occurrence, operating scenario, data source, deviation between intended operation and actual operation and/or configuration of a communication system or communication link between various communicating nodes, which may benefit from carrying into effect the disclosed schemes. In fact, the systems and methods according to this disclosure may be equally applicable to any person-in-the-loop or automated communication procedure in which real time analysis of the information, and fidelity of the information, contained in the voice or data communications is of paramount importance to discerning operating intent for any vehicle or machinery and deviations from that intent discerned through real time monitoring of actual operations and response of the vehicle or machinery.

Specific reference to, for example, the above-discussed scenario for air traffic control communication with aircrew on aircraft in flight as providing a particular real-world example of where the systems and methods according to this disclosure may be particularly advantageously employed should be understood as being exemplary only, and not limiting the disclosed schemes, in any manner, to any particular class of users, any particular class of communications, any particular communication link or protocol, or any particular operating scenario in which the disclosed schemes may be implemented.

Features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations of features particularly pointed out in the appended claims.

Various embodiments of the disclosed systems and methods are discussed in detail below. While specific implementations are discussed, it should be understood that this is done for illustration purposes only. A person skilled in the relevant art will recognize that other components and configurations may be used without departing from the spirit and scope of the disclosed embodiments.

Accuracy of comparison between the digital messages and the transmitted and received voice messages may aid in determining whether the messages are, for example, contextually appropriate to formulate an indication of specific intent for the operation of the aircraft. Accuracy comparison between, for example, the digital messages and the transmitted and received voice messages may examine the content to ensure that the transmitted and received voice messages indicate that the voice messages are appropriately responsive to directions given, or inquiries presented and that intended operations for the aircraft in real time may be derivable from those first level comparisons. On one level, such an embodiment may be understood to automate a manual read back for comparison with the introduction of voice recognition and derived data comparison. Such an automated crosscheck, or "double check," may provide a conventionally unavailable level of quality assurance in the data and voice communications that will render those communications further acceptable for comparing the intent represented by those communications with the otherwise derivable all source data regarding actual operation of the aircraft. The data may be compared for accuracy, checked for logical coherence, and otherwise measured against, for example, prescribed standard and emergent operating parameters that may be available from myriad sources.

The disclosed subject matter may be accurately illustrated through the following informational examples.

An air traffic controller, via a voice communication center, or directly, may send instructions to aircrew in an aircraft to climb to a specific altitude (the intended maneuver). Within a prescribed amount of time, the aircraft should have begun deviation from its current flight path to reach the assigned altitude or at least have started to climb to that altitude (the actual maneuver). The actual maneuver (climbing) of the aircraft may be reflected through various data sources to include aircraft avionics messages over datalink as well as from various flight following or other (e.g., Radar) sources potentially on the ground, or cooperatively in the air.

The disclosed schemes seek to leverage through voice recognition of air to ground (or ground to air) voice communication, and the various other data sources, to double check that the information available from combinations of these sources are in harmony as prescribing the intended maneuver, and that, for example, the actual maneuver results as an expected outcome. In response to an expected outcome having been determined not to have occurred in a requisite amount of time, the disclosed schemes may issue commands or other information to alert aircrew, ground personnel or other interested parties or equipment automation as to the deviation from the intended (or directed) maneuver (course of action). Appropriate additional responsive actions may then be undertaken by involved entities to enhance safety and operational compliance.

In another operational example, an aircraft-mounted onboard weather radar may depict an area of bad weather ahead of the aircraft along its intended route of flight. The intent, according to, for example, airline prescribed guidance, directive or doctrine, may be to avoid the area of bad weather altogether, or according to some prescribed scheme. Deviating from the indicated intent, the aircraft may proceed to fly through the area of bad weather. Certain aircraft operating parameters may be measured to determine that the choice of the aircrew to deviate from the intended operations and to fly through the area of bad weather may be catalogued as a deviation from established procedures for the airline. In such an instance, an alert may be generated to specify a need, for example, to particularly inspect certain portions of the aircraft once it reaches its destination to determine whether any particular damage has occurred as a result of the aircrew's choice to deviate from procedure, or to take other appropriate action.

In a case of hard landing, the disclosed schemes may provide the necessary communication components to determine whether a reportable impact force threshold has been exceeded and may further execute reporting schemes by which to implement monitoring to, for example, determine if a maintenance check is reported, and, in the absence of such appropriate action, to generate a maintenance alert. In such an instance, the intended operation is to land the aircraft within parameters as indicated by aircraft performance and/or operating manuals, and the actual operation (leading to indication of a deviation from the intent) would be according to the measurement of a hard landing. The magnitude of the hard landing would be the deviation and the required alert may be sent to ensure that appropriate inter-flight maintenance procedures are performed.

The possibilities are virtually limitless in applying the disclosed schemes to, for example, derive aircraft intent from airline operating guidelines, directives, and/or policies (all of which may be database available). Airline policy may, for example, to ensure even wear on the engines specify taxiing the aircraft to the runway for takeoff with only the left engine operating and taxiing in from the runway after landing with only the right engine operating. The disclosed schemes may compare actual monitored operations to detect and report (as appropriate) deviations. In a similar manner, the disclosed schemes may be implemented to monitor compliance with prescribed noise abatement regulations at a particular airport. Takeoff performance characteristics and maneuvering may be monitored to determine compliance. Separately monitoring may discern that (or whether) a particular aircrew's operation of the aircraft is according to guidelines for, for example, optimizing fuel consumption through execution of specified climb profiles and/or only authorized deviations.

In embodiments, the disclosed schemes may detect deviations from intended operations, operating parameters or operating values that may be indicative of, for example, a deviation from an intended flight planned route, which should result in a verbal report to air traffic control. Separately, the disclosed schemes may detect actual or pending failures in various installed components or equipment as deviations from intended operations. Actual failures will generally result in a verbal report to air traffic control. When deviations are detected, but may go unreported, the disclosed schemes may employ those detections as triggers and expect some subsequent voice report or pilot-initiated data link report. When no such reporting action takes place, information on the failure of agreement of the actions of the aircraft/aircrew in response to certain operational and/or environmental conditions may be forwarded, in an automated manner, to a central communicating location for action and/or dissemination to other entities for action, or and in addition provide a real time alert to the aircrew. Physical components for executing the disclosed schemes, i.e., a location of the implementing components may be on board the aircraft, at an air traffic control facility, in a central communication facility, or at various other locations.

Implementations of the disclosed schemes may occur when, for example, new implementing avionics components are installed on an aircraft. The installations may include a storage unit in which a particular database of known operating parameters, guidelines, procedures, directives and/or terms may be stored.

Separately, implementations of the disclosed schemes may locate the above-described communicating and analysis components in one or more ground-based communication centers in which current voice-to-data and data-to-voice conversions/transcriptions may occur. In such installations, appropriate leveraging may occur with respect to data downlinked from an aircraft, and voice communications undertaken with the aircrew in the aircraft. Certain ground-based installations may actively employ existing (known) service applications and store all manner of standard and emergency operating procedures prescribed for operation of a particular aircraft according to a controlling entity's or agency's desires and/or aircraft performance parameters that may be queried in circumstances to compare to actually reported aircraft operations to highlight the deviations from the intended operations.

In a particular installation, the disclosed schemes may provide what could be considered a second set of eyes on interactive communications through automation (voice recognition) that would compare both sides of the radio operator exchange (voice over HF/VHF/Iridium/Inmarsat and data via, for example, an Air Ground Terminal System or Air Ground Network (AGN)) and flag for double check any apparent disconnects.

In embodiments, certain recognizable common terms and/or keywords may be provided in, for example, a database. Routine review of the information in the database may be used to compare to the information contained in the communications to alert one or more of the aircrew in the aircraft or the air traffic control facility to some situation that may invoke special handling as the aircrew in the air traffic controllers cooperatively interact. Such cooperative interaction may include, for example, commencing particular procedures responsive to the situation announced by use of a particular term by either of the aircrew or the air traffic controllers. Additional responsive personnel, including law enforcement personnel, may be alerted when situations dictate. Separately, special handling equipment that may be required to respond to a particular situation may be pre-positioned based on the received automated alert.

FIG. 1 illustrates an exemplary overview of an operating environment 100 in which the aircraft intent harmonization schemes according to this disclosure may be implemented. As shown in FIG. 1, the exemplary operating environment 100 may encompass myriad lines of communication between a number of components and communicating nodes.

A centralized communication facility 110 may communicate with an aircraft 130 directly, or via an air traffic control facility 120. Conversely, the air traffic control facility 120 may communicate with the aircraft 130 via the centralized communication facility 110. Separately, although depicted in FIG. 1, as having communications between the aircraft 130 and aircraft control or operating entities 180 pass through the centralized communication facility 110, those of skill in the art recognize that an air traffic control facility 124 and aircraft 130 may communicate directly with particular aircraft controller operating entities 180. It is commonly understood that an aircraft generally has on board installed components for monitoring the operations of the aircraft and for communicating those operations across multiple communications links with ground-based control and coordination facilities, generally in the manner depicted. The depiction in FIG. 1 is intended to provide a representative, and non-limiting, overview of possible (or likely) ground-based controlling coordination facilities with which an aircraft 130 may routinely communicate.

Generally depicted in FIG. 1, the aircraft 130 may include an avionic subsystem 132, a data analysis subsystem 134, and a communication subsystem 136. These individual subsystems may operate cooperatively to (1) aid the aircrew in the safe operation of the aircraft 130, (2) monitor and analyze operations of the aircraft overall, or of particular installed components systems, and (3) indicate to monitoring ground-based facilities such as, for example, air traffic control facility 120 and/or centralized communication facility 110, an intent as to the operation of the aircraft 130 particularly in response to emergent issues that may arise during aircraft operations that may cause planned and announced deviations in the aircraft operations from, for example, a flight planned route.

As is indicated briefly above, conventional analysis of aircraft operations may be supplemented with a logic unit, comprising a portion of an expanded data analysis subsystem 134, or otherwise as a separately installed component on the aircraft 130, for assimilating all source data regarding the operation of the aircraft 130 according to the processes and schemes outlined above to determine, in a first instance, an intended operation of the aircraft 130. The determined intended operation of the aircraft 130 may then be compared to actual real-time, or near real-time, operating parameters for myriad monitored subsystems within the aircraft 130 to determine whether substantial (and non-communicated) deviations from the intended operation of the aircraft 130 exist. In such instances, the data analysis subsystem 134 may direct that an alert be forwarded via the communication subsystem 136 to one or more ground-based control and monitoring facilities in order that aircraft controlling or operating entities 180 may ultimately be informed of the determined deviations. These aircraft control or operating entities 180 may take appropriate and/or necessary corrective actions to address on acceptable deviations. Such corrective actions may be holy, and completely, at the discretion of the aircraft controlling or operating entities 180.

As is indicated above, the requisite analysis may be undertaken by logical components installed on the aircraft 130, or may otherwise be housed, for example, in the air traffic control facility 120. Each air traffic control facility 120 is typically in communication with aircraft 130 directly, and/or via a centralized communication facility 110. An appropriately configured communication suite 122 in the air traffic control facility 120 and an appropriately configured communication suite 112 in the centralized communication facility 110 may facilitate these communications between the separate entities via voice and data radio communications, for example. Where analysis of aircraft intent, and deviation in actual aircraft operations from that intent, is intended to be undertaken in the air traffic control facility 120, logic components may be included in, for example, a data exchange/analysis server 124 housed in the air traffic control facility 120. When analysis of aircraft intent, and deviation actual aircraft operations from that intent, is intended to be undertaken in the centralized communication facility 110, the logic components may be included in, for example, a data analysis server 114 housed in the centralized communication facility 110. The depicted server components may separately be hosted apart from and in communication with the particular facilities depicted in FIG. 1, and may, for example, be hosted as cloud-based applications, where appropriate.

The centralized communication facility 110 may have an external communication interface that is particularly configured as an all source data exchange interface 116. Such an all source data exchange interface 116 may be employed to communicate with myriad separate data sources. Such data sources may include, but not be limited to, airline normal/emergency operating procedure data source(s) 150, aircraft operating parameter data source(s) 155, flight planning resource data source(s) 160, meteorological information data source(s) 165, and other (like) data source(s) 170, which may be queried routinely to provide data and informational inputs usable by the analytic components, regardless of where their house, according to this disclosure, to formulate an intended aircraft operation scheme that comports with all of the relevant procedures, guidelines, directives and operating parameters available from one or more of the data sources.

Figure 2:
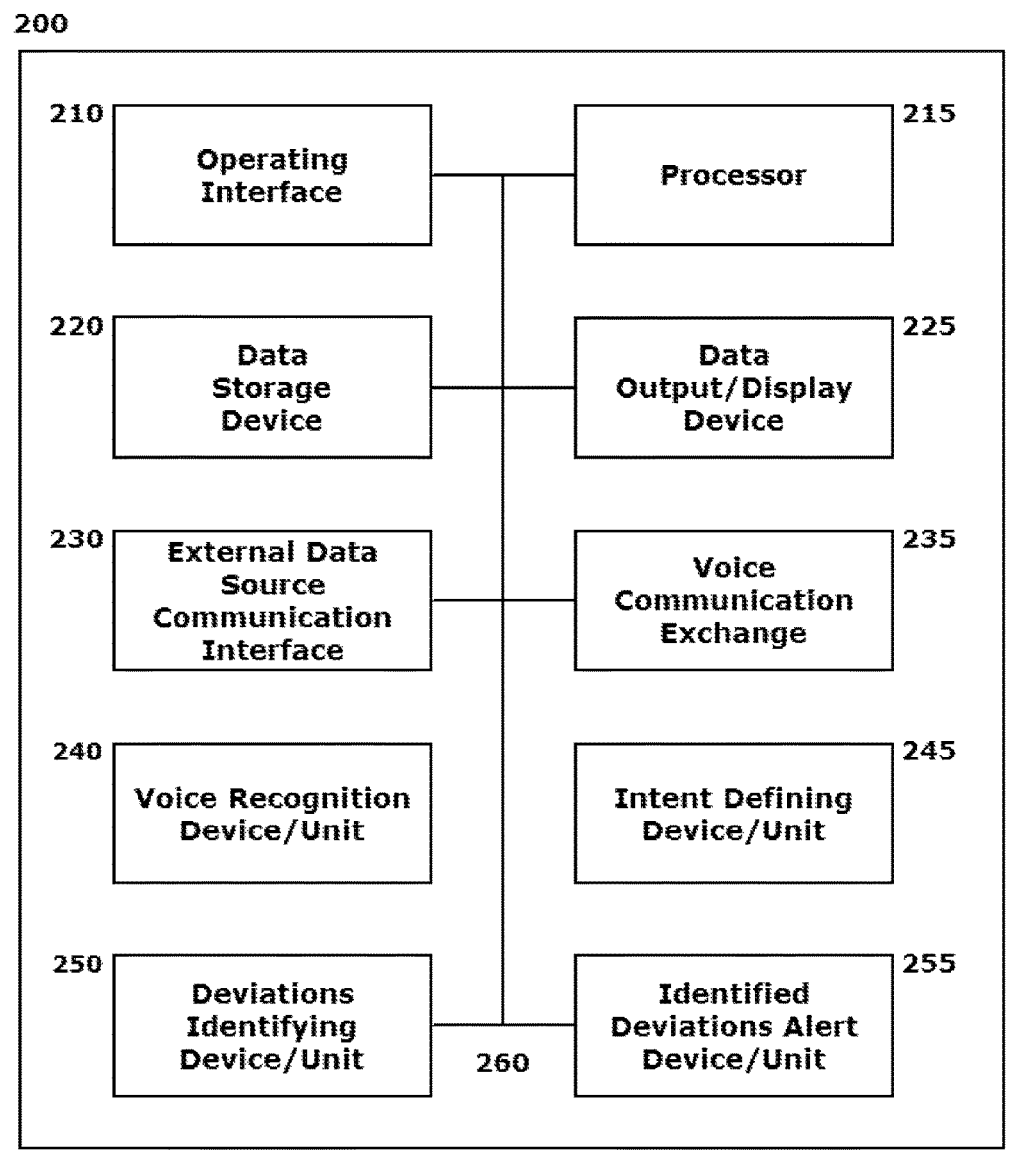
FIG. 2 illustrates an exemplary voice/data communication, data analysis and control system, components of which may be housed in a central communication facility, for implementing the aircraft intent harmonization schemes according to this disclosure.

FIG. 2 illustrates an exemplary voice/data communication, data analysis and control system 200, components of which may be housed in a central communication facility 110 (as shown in FIG. 1), for implementing the aircraft intent harmonization schemes according to this disclosure. The exemplary system 200 shown in FIG. 2 may be implemented as a combination of system components associated with the central communication facility, including as cloud-based processing and data storage components, or otherwise may be wholly, or partially, installed or hosted in one or more participating aircraft or in one or more air traffic control facilities.

The exemplary system 200 may include an operating interface 210 by which a user may communicate with the exemplary system 200 for directing operations of the exemplary system 200 in implementing the aircraft intent harmonization schemes according to this disclosure. The user interface 210 may be usable in initiating and directing communication with the variety of data sources with which the exemplary system 200 coordinates among the plurality of connected nodes (as shown generally in FIG. 1 and described in detail above). Control, coordination communication inputs received in the exemplary system 200 via the operating interface 210 may be processed and communicated to any one or more of the many connected nodes in communication with the exemplary system 200. The operating interface 210 may be a part or a function of a graphical user interface (GUI) mounted on, integral to, or associated with, the exemplary system 200. The operating interface 210 may alternatively take the form of any commonly user-interactive device by which user inputs and/or commands are input to an automated processing system including, but not limited to, a keyboard or a touchscreen, a mouse or other pointing device, a microphone for providing verbal commands, or any other commonly-known operating interface device.

The exemplary system 200 may include one or more local processors 215 for carrying out the individual operations and functions of the exemplary system 200. The processor 215 may reference, for example, each communication with one or more data sources, with an air traffic control facility, and with communications, monitoring or avionics components installed in an aircraft in a coordinated manner to undertake the aircraft intent harmonization scheme in the exemplary system 200. The processor 215 may direct storing of the additional information, or communication of any determined discrepancy or deviation between intended and actual aircraft operations in appropriate databases and/or coordinate the alerting functions to advise the appropriate aircraft control or operating entities as to the determination of such a discrepancy or deviation. The processor 215 may initiate requisite queries of the respective data sources as appropriate to compile an indication of intent in the operation of the aircraft.

The exemplary system 200 may include one or more data storage devices 220. Such data storage device(s) 220 may be used to store data or operating programs to be used by the exemplary system 200, and specifically the processor(s) 215 in carrying into effect the disclosed operations and functions. Data storage device(s) 230 may be used to store information obtained from respective external data sources as it may pertain to the operation of a particular aircraft at a particular time. The storage of such data may streamline the determination of intended operation of the aircraft, and changes in that intended operation as emergent factors may dictate. Determined discrepancy and/or deviation information may be stored for later analysis, review, and other beneficial purposes in order to provide, for example, periodic feedback to the aircraft control or operating entities regarding recurring discrepancies and/or deviations.

The data storage device(s) 220 may include a random access memory (RAM) or another type of dynamic storage device that is capable of storing updatable database information, and for separately storing instructions for execution of system operations by, for example, processor(s) 215. Data storage device(s) 220 may also include a read-only memory (ROM), which may include a conventional ROM device or another type of static storage device that stores static information and instructions for processor(s) 215. Further, the data storage device(s) 220 may be integral to the exemplary system 200, or may be provided external to, and in wired or wireless communication with, the exemplary system 200, including as cloud-based storage and/or processing elements.

The exemplary system 200 may include at least one data output/display device 225, which may be configured as one or more conventional mechanisms that output information to a user, including, but not limited to, a display screen on a GUI associated with the exemplary system 200 to provide feedback to an operator of the exemplary system 200 regarding, for example, system health, an indication of a determined deviation or discrepancy and a translation/communication of information related to the determined deviation or discrepancy via the exemplary system 200 to one or more of an aircraft, an air traffic control facility, and a relevant aircraft controller operating entity. In embodiments, the at least one data output/display device 225 may comprise some manner of situational awareness display for aircraft operating in a particular sector under the control of a particular traffic control facility and/or a particular central communication facility. In circumstances in which an air traffic control-like situational awareness display may be provided in other than an air traffic control facility, such display may afford an operator of the exemplary system 200 to provide an additional set of eyes on deviations and discrepancies, and their potential impact, as emergent situations or occurrences may arise.

The exemplary system 200 may include at least one external data source communication interface 230. Each interface 230 may be particularly configured to coordinate communications between the exemplary system 200 and each of the available data sources that may be referenced for compiling information to indicate intended operations for an aircraft. Separately, individual interfaces 230 may communicate with data exchange and monitoring components with an aircraft in order to provide inputs that may allow the exemplary system 200 integrate all available information appropriate to characterizing actual operations of the particular aircraft. As indicated above, the disclosed schemes may be implemented by the exemplary system 200 of assimilating all available information from multiple data sources to determine a real-time or near-real-time intent for the operation of an aircraft, and compare that with actual monitor operation of the aircraft in order to discern deviations and/or discrepancies between the intended operation than the actual operations.

The exemplary system 200 may include at least one voice communication exchange 235. The voice communication exchange 230 may be in the form of, for example, any commonly known radio set or other voice communicating device by which informational and/or directive voice communications may be exchanged between ground-based communication sources and aircraft.

The exemplary system 200 may include at least one voice recognition device/unit 240, which may be available to convert voice communications received from any source to data elements, or conversely to convert data elements received from any source to voice communications. An objective of the inclusion of such a voice recognition device/unit 240 may be to provide an automated transcription of the voice communications into a format that is usable by the exemplary system 240 to supplement other source data to generate and/or modify indications of intent for the operation of the aircraft, and/or to evaluate individual entities' requisite responses to emergent situations which may cause acceptable deviations in the actual operation of the aircraft from the intended operations, or to otherwise provide a storable record of all man-in-the-loop responses to particular deviations that should be corrected.

The exemplary system 200 may include an intent defining device/unit 245 that may assimilate and integrate all source data to generate and/or modify indications of intent for the operations of the aircraft. The intent defining device/unit 245 may be an integral function of one or more processors 215, or may exist separately as a standalone device/unit in the exemplary system 200. Analytic algorithms carried into effect by the intent defining device/unit 245 may obtain flight plan information, meteorological information, aircraft operating parameter information, standard operating procedure information, and other like information with regard to operation of a particular aircraft at a particular time and integrate the obtained information in a manner that determines whether intended operations of the aircraft initially meet all of the requisite constraints. The intent defining device/unit 245 may be usable throughout an operating event for an aircraft from start-up to shut down to continually iterate available data source information, including prognostic information received from an aircraft to appropriately modify and update in real-time or near real-time changes in the intended operation of the aircraft.

The exemplary system 200 may include a deviations identifying device/unit 250. The deviations identifying device/unit 250 may be an integral function of one or more processors 215, or may exist separately as a standalone device/unit in the exemplary system 200. The deviations identifying device/unit 250 may reference current information available from the intent defining device/unit 245 and all source information monitoring the actual operations of the aircraft, whether located on, or external to, the aircraft. The deviations identifying device/unit 250 may undertake a comparative analysis of the actual operation of the aircraft with the intended operation of the aircraft in order to identify (or determine) deviations and/or discrepancies in the actual operation of the aircraft with respect to the defined intent for those operations. Identified deviations and/or discrepancy may be stored locally for later analysis or other use.

The exemplary system 200 may include and identify deviations alert device/unit 255, which may be usable to obtain information regarding deviations and/or discrepancies identified by the deviations identifying device/unit 250 and format proper information exchange, alert, or warning messages to be transmitted via, for example, one or more external data source communication interfaces 230 2 a targeted recipient. Such targeted recipients may include the aircraft that is determined to have deviated, an air traffic control facility in communication with the aircraft that is determined to have deviated, and/or an aircraft control or operating entity associated with the aircraft that is determined to have deviated. Other stakeholders may be referenced as appropriate. These other stakeholders may include, for example, governmental agencies, law enforcement agencies, aircraft manufacturing entities, or other agencies or entities that may benefit from being alerted to unexpected deviations or discrepancies between defined intentions for the operation of an aircraft and actual operations of the aircraft.

All of the various components of the exemplary system 200, as depicted in FIG. 2, may be connected internally, and potentially remote data storage and processing facilities or components, by one or more data communication and/or control busses 260. These data communication and/or control busses 260 may provide wired or wireless communication between the various components of the exemplary system 200, whether all of those components are housed integrally in, or are otherwise external and connected to, other components of an overarching aircraft communication and control or aircraft intent harmonization network with which the exemplary system 200 may be associated.

It should be appreciated that, although depicted in FIG. 2 as an essentially integral unit, the various disclosed elements of the exemplary system 200 may be arranged in any combination of sub-systems as individual components or combinations of components, integral to a single unit, or external to, and in wired or wireless communication with, the single unit of the exemplary system 200. In other words, no specific configuration as an integral unit or as a support unit is to be implied by the depiction in FIG. 2. Further, although depicted as individual devices/units for ease of understanding of the details provided in this disclosure regarding the exemplary system 200, it should be understood that the described functions of any of the individually-depicted components may be undertaken, for example, by one or more processors 215 connected to, and in communication with, one or more data storage device(s) 220, all of which may support implementation of the disclosed aircraft intent harmonization schemes.

Figure 3:
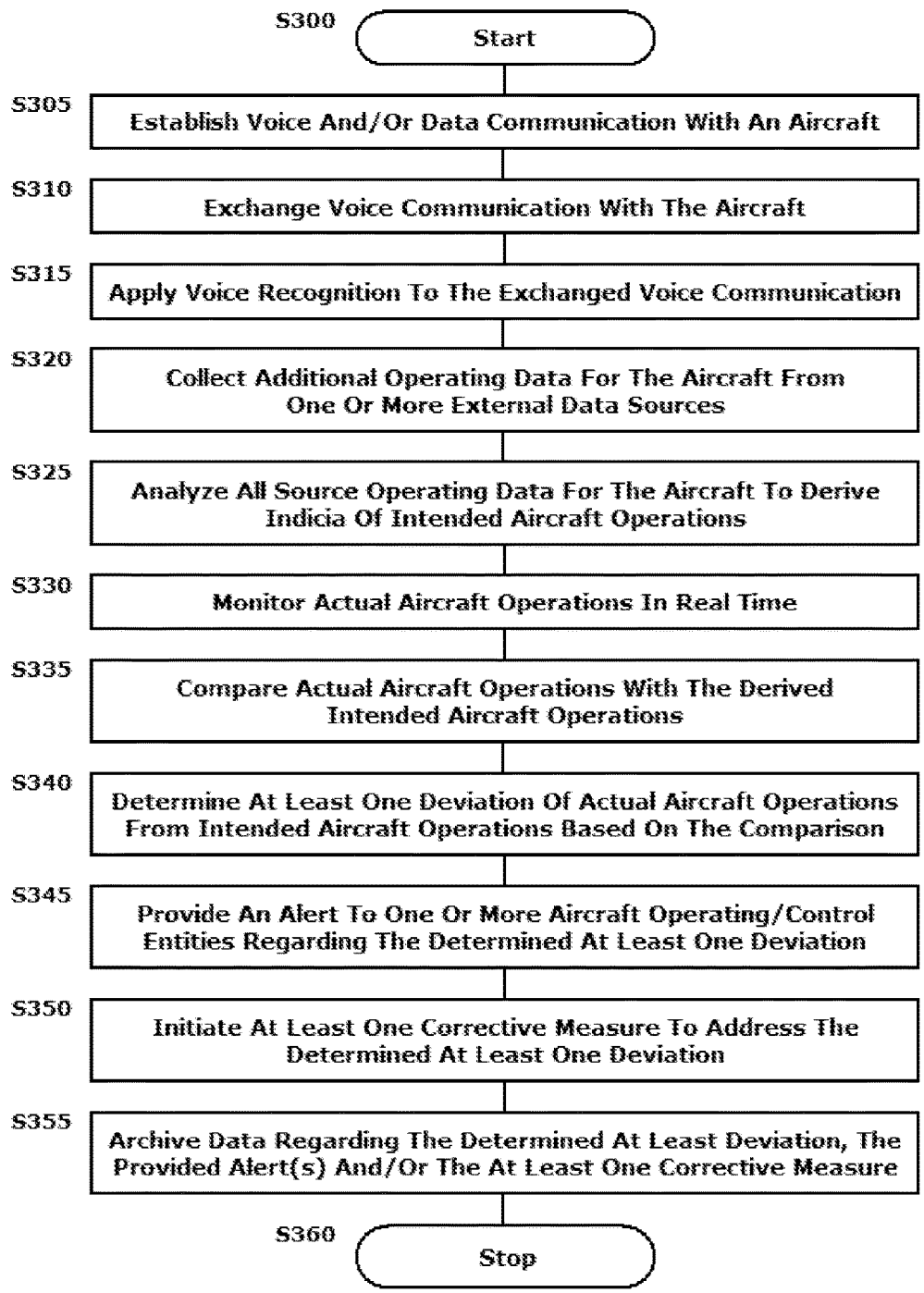
FIG. 3 illustrates a flowchart of an exemplary method for implementing an automated aircraft intent harmonization scheme according to this disclosure.

The disclosed embodiments may include an exemplary method for implementing an automated aircraft intent harmonization scheme. FIG. 3 illustrates an exemplary flowchart of such a method. As shown in FIG. 3, operation of the method commences at Step S300 and proceeds to Step S305.

In Step S305, voice and data communication may be established with a particular participating aircraft. As shown in FIG. 1, such voice and/or data communication may be established between the aircraft and one or more of a central communication facility, an air traffic control facility, or other like facility, including, but not limited to, a facility operated by an aircraft control or operating entity. Operation of the method proceeds to Step S310.

In Step S310, a voice communication may be exchanged over the established communication link with the aircraft. Operation of the method proceeds to Step S315.

In Step S315, a voice recognition scheme may be applied to the exchanged voice communication. An objective of applying a voice recognition scheme may be to transcribe voice communications into a data-searchable, or data-comparable, format for use in establishing or modifying information regarding intended operations of the aircraft. Operation of the method proceeds to Step S320.

In Step S320, additional operating data for the aircraft and/or for the operations of the aircraft may be collected from one or more external data sources. Such data sources may include those as generally depicted in FIG. 1, and as described above. Operation of the method proceeds to Step S325.

In Step S325, the all source operating data for the aircraft, supplemented as appropriate by the transcribed data regarding voice communications, may be analyzed to derive information or other indicia of intended operations for the aircraft. As noted above, such analysis may include an initial process by which flight planning data provide the basic framework to be supplemented by meteorological data, aircraft performance data, and aircraft operating procedures or guidelines. Following an initial process, it is recognized that the data collection and analysis scheme will be ongoing as circumstances dictate acceptable deviations requiring modification of a "known" intent for the operation of the aircraft in any particular phase of an aircraft movement evolution generally from engine start to engine shutdown. Operation of the method proceeds to Step S330.

In Step S330, actual aircraft operations are monitored in real-time, or in near real-time. Such monitoring may be via data feeds from aircraft onboard monitoring equipment that updates a status of airframe, propulsion, avionics and/or communications systems in the aircraft. Such monitoring may also take into account information receivable from radar, flight following, and other monitoring sources external to (and potentially in control of) the aircraft. Operation of the method proceeds to Step S335.

In Step S335, a comparison is made between actual aircraft operations and the derived intended aircraft operations. This comparison may account for (and generally ignore) deviations or discrepancies between intended operations and actual operations that may lie within acceptable thresholds. Operation of the method proceeds to Step S340.

In Step S340, a determination may be made that at least one deviation of actual aircraft operations from an intended aircraft operations lies outside an acceptable parameters range based on the comparison undertaken in Step S335. Otherwise, any deviation or discrepancy between an intended aircraft operation and an actual aircraft operation may be determined to be unacceptable. Operation of the method proceeds to Step S345.

In Step S345, an alert may be provided to one or more aircraft operating/control entities regarding the determined at least one deviation. Such alerts may be provided in a form of information or warnings. It may be left to the one or more aircraft operating/control entities to determine what, if any, corrective action should be undertaken. Particularly recurrent emergent situations in a particular aircraft, class of aircraft, region, or with particular aircrew, may be evaluated to determine a level of corrective action that may be necessary to address issues that arise with more than routine frequency. Operation of the method proceeds to Step S350.

In Step S350, particularly in situations determine deviations require an immediacy of response for, for example, safe separation or other safety considerations, at least one corrective measure to address the deviations may be initiated. Such corrective action may include, but not be limited to, compulsory direction to an aircrew to initiate mandatory maneuvers, and a monitoring of the completion of those mandatory maneuvers to resolve an emergency, or unsafe situation. Certain avionics or aircraft systems, for example, may be controlled or adjusted to preset settings in automated response to the determined deviation. As a particular example, an onboard transponder may be set to broadcast a particular code indicating an emergency situation. As technology increases, such corrective measures may include an external entity taking positive control of the aircraft and maneuvering the aircraft through such positive control to avoid the emergency or unsafe situation. Operation of the method proceeds to Step S355.

In Step S355, data regarding a determined at least one deviation, any provided alerts, and any corrective measures may be collected and archived for later use including analysis and deviations/incident reconstruction. Operation of the method proceeds to Step S360, where operation of the method ceases.

The disclosed embodiments may include a non-transitory computer-readable medium storing instructions which, when executed by a processor, may cause the processor to execute all, or at least some, of the functions that may be appropriate to implementing the steps of the method outlined above.

The above-described exemplary systems and methods reference certain conventional communicating and/or computing components to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in integrating all source data/information to derive an intended operation for an aircraft as a comparative baseline for assessing deviations in the actual operation of the aircraft using many and widely-varied system components.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 3, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual interaction with a particular aircraft that may individually reliably employ components of the disclosed system, or carry out functions of the disclosed schemes. This enables each access unit and/or personal electronic device to enjoy the benefits of the disclosed embodiments even if any one of the large number of possible end-user nodes (including individual aircraft) do not need some portion of the described functionality. In other words, there may be multiple instances of the disclosed system each processing the content in various possible ways. It does not necessarily need to be one system used by all end-user nodes. Accordingly, the appended claims and their legal equivalents should only define the disclosed embodiments, rather than any specific examples given.

We claim:

1. A system for monitoring aircraft operations, comprising:
a user control system onboard the aircraft that controls operation of an aircraft;
a data collection device that collects data elements from a plurality of data sources, the data elements relating to operation of the aircraft;
a data integration device that integrates and analyzes the collected data elements to specify an intended operating scheme for the operation of the aircraft;
an aircraft monitoring device that monitors a plurality of operating parameters to resolve an actual operating scheme for the operation of the aircraft;
a data comparison device that compares information of the actual operating scheme with the intended operating scheme to discern a deviation between the actual operating scheme and the intended operating scheme; and
a deviation alerting device that advises one or more users of the discerned deviation, wherein one or more components of the user control system are adjusted in response to the discerned deviation.

2. The system of claim 1, the data elements including two or more of flight planning data elements, meteorological data, aircraft performance parameter data, operating limitations data, and aircraft systems operating data.

3. The system of claim 1, wherein:
the data collection device of continually or periodically collects and updates the data elements from the plurality of the data sources for a duration of a specified operating event for the aircraft;
the data integration device integrates and analyzes the updated data elements to specify an updated intended operating scheme for the operation of the aircraft; and
the data comparison device compares information of the actual operating scheme with the updated intended operating scheme to discern a deviation between the actual operating scheme and the updated intended operating scheme.

4. The system of claim 1, further comprising:
a communication monitoring device that monitors voice and data link communications to and from the aircraft; and
at least one of (1) a voice recognition device that converts monitored voice communications to actionable voice data elements, and (2) a data link conversion device that converts data link requests to actionable data elements,
the data integration device integrating and analyzing the actionable voice data elements and actionable data elements with the collected data elements to specify the intended operating scheme for the operation of the aircraft.

5. The system of claim 4, the data comparison device discerning a deviation between the actual operating scheme and the intended operating scheme based on a failure of the actual operating scheme to comply with elements of at least one of a voice communication exchange and a data link communication exchange with the aircraft.

6. The system of claim 4, wherein:
the aircraft monitoring device detects at least one of an abnormal operating condition or a system malfunction in one or more aircraft onboard system components;
the data integration device analyzes that the detected at least one of the abnormal operating condition or the system malfunction modifies the intended operating scheme for the operation of the aircraft; and
the data comparison device compares information of the actual operating scheme with the modified intended operating scheme to discern a deviation between the actual operating scheme and the modified intended operating scheme.

7. The system of claim 6, wherein:
at least one of the plurality of data sources includes specified procedures for an aircrew to respond to the at least one of the abnormal operating condition or the system malfunction;
the data integration device analyzes that the specific procedures for the aircrew to respond to the at least one of the abnormal operating condition or the system malfunction further modifies the intended operating scheme for the operation of the aircraft; and
the data comparison device compares information of the actual operating scheme with the further modified intended operating scheme to discern a deviation between the actual operating scheme and the further modified intended operating scheme.

8. The system of claim 7, wherein the deviation alerting device advises the aircrew of the discerned deviation.

9. The system of claim 7, wherein:
the specific procedures require that the aircrew indicate through at least one of voice communication and data link communication the detection of the of the at least one of the abnormal operating condition or the system malfunction;
at least one of monitoring by the communication monitoring device and analysis by the at least one of the voice recognition device and the data link conversion device determines a failure of the aircrew to provide the required indication; and
the data integration device analyzes that the failure of the aircrew to provide the required indication further modifies the intended operating scheme for the operation of the aircraft.

10. The system of claim 7, wherein:
the specific procedures indicate that certain actions be taken by assets external to the aircraft to respond to the detected at least one of the abnormal operating condition or the system malfunction; and
the deviation alerting device advises the assets external to the aircraft of the certain actions.

11. The system of claim 1, the data alerting device being configured to modify an operation of at least one aircraft system in response to the discerned deviation.

12. The system of claim 1, the data collection device, the data integration device; the data comparison device, and the deviation alerting device comprising aircraft-installed equipment.

13. The system of claim 1, at least one of the data collection device, the data integration device; the data comparison device, and the deviation alerting device being located in a ground-based communication facility.

14. The system of claim 1, further comprising a data storage device that stores data on at least one of the discerned deviation and the advice to the one or more users on the discerned deviation.

15. A method for monitoring aircraft operations, comprising:
- controlling, with components of a user control system, the operation of an aircraft;
- automatically collecting, with a processor communicating with a plurality date sources, data elements from the plurality of data sources, the data elements relating to operation of the aircraft;
- integrating and analyzing, with the processor, the collected data elements to specify an intended operating scheme for the operation of the aircraft;
- monitoring, with the processor communicating with aircraft system monitoring components, a plurality of operating parameters for the aircraft to resolve an actual operating scheme for the operation of the aircraft;
- comparing, with the processor, information on the actual operating scheme with the intended operating scheme to discern a deviation between the actual operating scheme and the intended operating scheme; and
- presenting, with the processor, an alert that advises one or more users of the discerned deviation, wherein one or more components of the user control system are adjusted in response to the discerned deviation.

16. The method of claim 15, the data elements including two or more of flight planning data elements, meteorological data, aircraft performance parameter data, operating limitations data, and aircraft systems operating data.

17. The method of claim 15, wherein the processor is further programmed to
- at least one of continually or periodically collect and update the data elements from the plurality of data sources for a duration of a specified operating event for the aircraft;
- integrate and analyze the updated data elements to specify an updated intended operating scheme for the operation of the aircraft; and
- compare information of the actual operating scheme with the updated intended operating scheme to discern a deviation between the actual operating scheme and the updated intended operating scheme.

18. The method of claim 15, further comprising:
- monitoring, with the processor, voice and data link communications to and from the aircraft; and
- employing at least one of (1) a voice recognition device associated with the processor to convert monitored voice communications to actionable voice data elements and (2) a data conversion device associated with the processor to convert monitored data link communications to actionable data elements,
- the processor being further programmed to integrate and analyze the at least one of the actionable voice data elements and the actionable data elements with the collected data elements to specify the intended operating scheme for the operation of the aircraft.

19. The method of claim 18, the processor being further programmed to discern a deviation between the actual operating scheme and the intended operating scheme based on a failure of the actual operating scheme to comply with elements of at least one of a voice communication exchange and a data link communication exchange with the aircraft.

20. The method of claim 18, wherein:
- the monitoring detects at least one of an abnormal operating condition or a system malfunction in one or more aircraft onboard system components, and
- the processor is further programmed to analyze that the detected at least one of the abnormal operating condition or the system malfunction modifies the intended operating scheme for the operation of the aircraft, and to compare information of the actual operating scheme with the modified intended operating scheme to discern a deviation between the actual operating scheme and the modified intended operating scheme.

21. The method of claim 20, wherein:
- at least one of the plurality of data sources includes specified procedures for an aircrew to respond to the at least one of the abnormal operating condition or the system malfunction, and
- the processor is further programmed to analyze that the specific procedures for the aircrew to respond to the at least one of the abnormal operating condition or the system malfunction further modifies the intended operating scheme for the operation of the aircraft, and to compare information of the actual operating scheme with the further modified intended operating scheme to discern a deviation between the actual operating scheme and the further modified intended operating scheme.

22. The method of claim 20, wherein:
- the specific procedures require that the aircrew indicate through at least one of voice communication and data link communication the detection of the of the at least one of the abnormal operating condition or the system malfunction,
- at least one of the monitoring of the communications and analysis by the voice recognition device and the data link conversion device determines a failure of the aircrew to provide the required indication, and
- the processor is further programmed to analyze that the failure of the aircrew to provide the required indication further modifies the intended operating scheme for the operation of the aircraft.

23. The method of claim 15, further comprising automatically modifying an operation of at least one aircraft system in response to the discerned deviation.

24. The method of claim 15, the processor comprising aircraft-installed equipment.

25. The method of claim 15, the processor being located in a ground-based communication facility.

26. The method of claim 15, further comprising storing data on at least one of the discerned deviation and the advice to the one or more users on the discerned deviation in a data storage device for subsequent review and analysis.

27. A non-transitory data storage medium storing instruction that, when executed by a processor, cause the processor to execute the steps of a method comprising:
- controlling, with components of a user control system, the operation of an aircraft;
- automatically communicating with a plurality of data sources to collect data elements from the plurality of data sources, the data elements relating to operation of the aircraft;
- integrating and analyzing the collected data elements to specify an intended operating scheme for the operation of the aircraft;
- communicating with aircraft system monitoring components to monitor a plurality of operating parameters for the aircraft to resolve an actual operating scheme for the operation of the aircraft;
- comparing information on the actual operating scheme with the intended operating scheme to discern a deviation between the actual operating scheme and the intended operating scheme; and alerting one or more users or the discerned deviation, wherein one or more components of the user control system are adjusted in response to the discerned deviation.

* * * * *